(12) United States Patent
Thomassey

(10) Patent No.: US 6,676,073 B2
(45) Date of Patent: Jan. 13, 2004

(54) PIVOTING POWER TRANSMISSION UNIT WITH PERIPHERAL FACE TOOTHED GEARWHEELS OF THE FACE GEAR TYPE

(75) Inventor: Lionel Thomassey, Fos sur Mer (FR)

(73) Assignee: Eurocopter, Marignane Cedex (FR)

( * ) Notice: Subject to any disclaimer, the term of this patent is extended or adjusted under 35 U.S.C. 154(b) by 0 days.

(21) Appl. No.: 10/262,824

(22) Filed: Oct. 2, 2002

(65) Prior Publication Data
US 2003/0071167 A1 Apr. 17, 2003

(30) Foreign Application Priority Data
Oct. 2, 2001 (FR) .......................... 01 12649

(51) Int. Cl.$^7$ .............................. B64C 27/22
(52) U.S. Cl. ................ 244/7 R; 244/53 R; 244/60; 74/420; 74/421 A
(58) Field of Search ............... 244/60, 53 R, 244/7 R, 54; 74/420, 421 A, 413, 416

(56) References Cited

U.S. PATENT DOCUMENTS

| | | | | |
|---|---|---|---|---|
| 2,869,384 A | * | 1/1959 | Schmitter | 74/420 |
| 3,942,387 A | * | 3/1976 | Stone et al. | |
| 4,437,355 A | * | 3/1984 | Bordat | |
| 5,149,311 A | * | 9/1992 | Luijten | 74/420 |
| 5,233,886 A | * | 8/1993 | Bossler, Jr. | 74/416 |
| 5,239,880 A | * | 8/1993 | Hawkins et al. | |
| 5,572,910 A | * | 11/1996 | Tomaselli et al. | |
| 5,802,218 A | * | 9/1998 | Brailean | 74/416 |
| 5,807,202 A | * | 9/1998 | Sammataro | 74/416 |
| 6,260,429 B1 | * | 7/2001 | Andrei | 74/416 |
| 6,260,430 B1 | * | 7/2001 | Andrei | 74/420 |
| 6,276,633 B1 | * | 8/2001 | Balayn et al. | 244/7 R |
| 6,612,195 B2 | * | 9/2003 | Gmirya et al. | 74/416 |

FOREIGN PATENT DOCUMENTS

IT 0 971 155 A1 * 1/2000 .............. 74/416

* cited by examiner

Primary Examiner—Michael J. Carone
Assistant Examiner—L. Semunegus
(74) Attorney, Agent, or Firm—Sturm & Fix LLP

(57) ABSTRACT

A pivoting power transmission unit is provided for transmitting rotational drive from a power source to a rotor configured to revolve about a first axis and configured to swivel about a second axis perpendicular thereto. The transmission unit comprises: input pinion driven in rotation by the power source; two contra-rotating gearwheels which mesh with the input pinion and are co-axially mounted along the second axis; two cylindrical intermediate pinions, each joined to rotate co-axially with a respective one of the two gearwheels; and a further gearwheel in meshing engagement with the intermediate pinions. The further gearwheel drives in rotation an output shaft linked to the rotor.

17 Claims, 4 Drawing Sheets

PIVOTING POWER TRANSMISSION UNIT WITH PERIPHERAL FACE TOOTHED GEARWHEELS OF THE FACE GEAR TYPE

FIELD OF THE INVENTION

The invention relates to a pivoting power transmission unit, to drive in rotation, from at least one source of power in rotation, at least one driven component, designed to rotate about an axis of rotation which itself, during rotation of the driven component, has to swivel about a pivot axis substantially perpendicular to the axis of rotation of the driven component.

The pivoting power transmission unit according to the invention can be used, in a non-limiting manner, as a power transmission unit fitted to aircraft on which the propulsion system is swivellable.

In particular, as an embodiment for which the pivoting power transmission unit according to the invention is of great relevance for the applicant, such a power transmission unit can be used to drive in rotation, from at least one aircraft power unit, of the turboshaft engine type, for example, at least one rotor of an aircraft of the convertible type, which can operate in aeroplane mode or in helicopter mode, and in which the rotor drive shaft swivels about a pivot axis so that it can move from one position, in which the rotor operates as an aircraft propeller, for the aircraft to fly in aeroplane mode, to a position in which the rotor operates as a helicopter lift rotor, for the aircraft to fly in helicopter mode.

BACKGROUND OF THE PRESENT INVENTION

A pivoting power transmission unit for such a convertible aircraft with tilting rotors is described in particular in FR 2 791 319 and FR 2 791 634 to which reference should be made for further details.

It is pointed out however that these two patents describe a convertible aircraft with tilting rotors of the type in which the shaft of each rotor is driven in rotation about itself by a front reduction gear unit of one respectively of two power transmissions each also comprising a rear reduction gear unit linked to the corresponding front reduction gear unit, and also to one respectively of two (turboshaft) engines, each supported by one respectively of the two fixed wings of the aircraft, and to an interconnecting shaft linking the two transmissions for the two rotors to be driven in rotation by any one of the two engines in case of failure of the other engine.

The shaft of each rotor, the corresponding power transmission and the corresponding engine are housed in one respectively of two articulated pods, each comprising a front part mounted, so as to pivot about the pivot axis, on a stationary rear part, fixed to one respectively of the two fixed wings of the aircraft, and in which are housed the corresponding engine and at least in part the rear reduction gear unit of the corresponding transmission, the front reduction gear unit of which, embodied as a helicopter main gearbox, and also the shaft of the corresponding rotor are housed in the front pivoting part of the pod, and are mounted so as to pivot with this front part of the pod relative to the rear stationary part of the pod and the corresponding fixed wing.

FR 2 791 319 describes several modes of embodiment of the transmission of power between an engine, the corresponding rotor and the corresponding end of the interconnecting shaft (see FIGS. 5 to 10), but, in all cases, the pivoting reduction gear unit of each transmission, arranged as a helicopter main gearbox, comprises an output reduction gear stage of the epicyclic type, linked to the shaft of the corresponding rotor, and an input reduction gear stage, of the bevel or spiral bevel type, in which a bevel input pinion is coaxial with a cylindrical pinion pivoting about the pivot axis, and is joined with this pivoting pinion in rotation in at least one direction of rotation, while the rear non-pivoting reduction gear unit of each transmission is arranged as an intermediate gearbox, comprising a high-speed reduction gear stage comprising bevel or spiral bevel gears, the input bevel pinion of which is linked to an output shaft of the corresponding engine, and an intermediate reduction gear stage, engaging with the high-speed reduction gear stage and with the pivoting pinion, and also linked to the interconnecting shaft by a corresponding power takeoff, the intermediate reduction gear stage and also the pivoting pinion and the power takeoff linked to the interconnecting shaft consisting of a set of cylindrical pinions arranged as a lateral gear train relative to the output shaft of the engine and to the pivoting reduction gear unit, so as to leave sufficient space free between the front pivoting reduction gear unit and the rear non-pivoting reduction gear unit to allow the pivoting movements of the first with respect to the second of the two reduction gear units mentioned above.

The architecture of each transmission is therefore complex, and comprises a large number of pairs of teeth engaging with each other, to obtain the desired overall reduction ratio, between an output shaft of the engine revolving at a speed of rotation of the order of 20,000 rpm and the shaft of the rotor revolving at a nominal speed of between about 200 and 300 rpm, and to transmit the substantial drive torque required to the rotor shaft. Moreover, some of the reduction gear stages, particularly the epicyclic stage and the at least two bevel or spiral bevel gears required in each transmission, are bulky stages, heavily loaded and therefore dimensioned accordingly, involving high production costs and skilled maintenance because of the precision axial and radial adjustments required to position them and the resulting maintenance and interchangeability difficulties when working on these gears.

The present invention is intended to remedy the above disadvantages using an advanced pivoting power transmission unit equipped with peripheral face toothed gearwheels of the type known as face gears.

These peripheral face toothed gearwheels, sometimes also known as face gears or face-toothed gears, or again side tooth gears, are gearwheels on which one of the lateral faces has on its periphery teeth such as described in particular in EP 227 152, to which reference may advantageously be made for information on the milling of such teeth and the advantages deriving from them.

The use of peripheral face toothed gearwheels of the face gear type in power transmissions in aviation has already been proposed, in particular for fitting to single-turbine or multi-turbine helicopter main gearboxes, particularly in EP 234 058, EP 971 155 and U.S. Pat. No. 6,260,429, which present the advantages resulting from the use of such peripheral face toothed gearwheels in these particular applications, in terms of reduction in size and weight, higher reduction ratios, easier gear positioning and interchangeability and therefore improved reliability and easier maintenance.

SUMMARY OF THE INVENTION

A purpose of this invention is to make use of the same advantages in connection with a pivoting power transmission unit, no example of embodiment of which is proposed in the patents quoted above for a power transmission unit using peripheral face toothed gearwheels of the face gear type.

According to one aspect of the present invention, there is provided a pivoting power transmission unit for transmitting rotational drive from at least one source of power to at least one driven component configured to revolve about an axis of rotation and configured to be swivelled about a pivot axis substantially perpendicular to said axis of rotation, the pivoting power transmission unit comprising:

a cylindrical input pinion, configured to be driven in rotation by said at least one source of power about an axis which is substantially perpendicular to said pivot axis;

first and second gear wheels with peripheral face teeth of the face gear type which are facing each other, the first and second gear wheels being coaxial with said pivot axis and in meshing engagement with said input pinion so as to contra-rotate about said pivot axis when rotated by the input pinion;

two cylindrical intermediate pinions, each of which is joined to rotate co-axially about said pivot axis with one respectively of the first and second gear wheels; and a third gear wheel with peripheral face teeth of the face gear type which is in meshing engagement with each of said two intermediate pinions, the third gear wheel being configured to drive in rotation an output shaft coupled to said at least one driven component.

Compared with the embodiments described in FR 2 791 319, it is noted that the pivoting power transmission unit according to the invention dispenses with the need for a lateral gear train, which plays only a small part in obtaining the required overall reduction ratio, and also eliminates the epicyclic train and the bevel or spiral bevel gears of the front pivoting reduction gear unit.

In fact, the use of the two peripheral face toothed gearwheels of the face gear type mounted so as to be coaxial and contrarotating, and of the third gearwheel of the same kind allows high reduction ratios, of at least six to seven per reduction gear stage, to be obtained with a minimum number of pairs of teeth engaging with each other.

Advantageously, the transmission unit also comprises at least one cylindrical balance pinion, with straight or helical teeth, mounted as an idler gear in-rotation about an axis substantially coplanar with the axis of the input pinion, the teeth of which mesh with the teeth of said two contrarotating gearwheels, in order to balance the forces which are introduced by the input pinion into the two coaxial and contrarotating gearwheels between which the input pinion and each balance pinion are engaged.

In a simple and effective manner, the transmission unit comprises only one balance pinion, the axis of rotation of which is substantially in the prolongation of the input pinion. In this way, the input pinion and the balance pinion revolve about coaxial axes and are diametrically opposite relative to the two coaxial and contrarotating gearwheels with which these two pinions are engaged.

Also advantageously, the third gearwheel is substantially in the shape of a hollow truncated cone, and houses parts of the two coaxial and contrarotating gearwheels at the opposite end to the input pinion and also, where applicable, the balance pinion or pinions, greatly improving the overall compactness of the transmission unit.

In a practical manner, the connection in rotation between the third gearwheel and the output shaft is provided by the fact that this third gearwheel has a central axial bore with splines engaging with axial splines on the output shaft to provide the drive in rotation of said output shaft.

Thus the pivoting power transmission unit according to the invention advantageously comprises a first reduction gear stage, comprising the input pinion, the two coaxial and contrarotating gearwheels and, where applicable, said at least one balance pinion, and a second reduction gear stage comprising the two intermediate pinions, the third gearwheel, and the output shaft, substantially coaxial with the third gearwheel, the second reduction gear stage being mounted and guided in rotation in a casing mounted so as to pivot relative to the first stage about the pivot axis, the pivoting movements of this being controlled by at least one actuator.

Also advantageously, the first reduction gear stage is mounted and guided in rotation in a stationary casing, not pivoting about said pivot axis, and on which the pivoting casing can be mounted so as to swivel about said pivot axis, and swivelled by at least one actuator supported on a stationary point on a carrier structure or said stationary casing. This actuator may be a rotary or linear actuator, of hydraulic or electro-mechanical type, and preferably, when it is a linear actuator, this actuator may be of the hydraulic jack type or electro-mechanical jack type with a ball screw or rack cooperating with a gearwheel driven in rotation by an electric motor. In the case of a linear actuator, the latter may be mounted as described and shown in the French patents quoted above, in which the linear actuator is linked at one end to an arm projecting from the pivoting casing and at the other end to a stationary point on the carrier structure which in this case is a stationary point in the stationary rear part of the corresponding pod. As a variant, the stationary point may also be on the stationary casing or on components supporting this stationary casing.

The third gearwheel is advantageously guided in rotation in the pivoting casing by at least one double-row skew-angle ball bearing, and the output shaft is guided in rotation in this same pivoting casing by at least two bearings spaced apart from each other axially.

BRIEF DESCRIPTION OF THE DRAWINGS

Other advantages and characteristics of the invention will become clear from the description given below, purely by way of a non-limiting example of embodiment, with reference to the appended drawings in which.

DETAILED DESCRIPTION OF SPECIFIC EMBODIMENT

Figure 1:
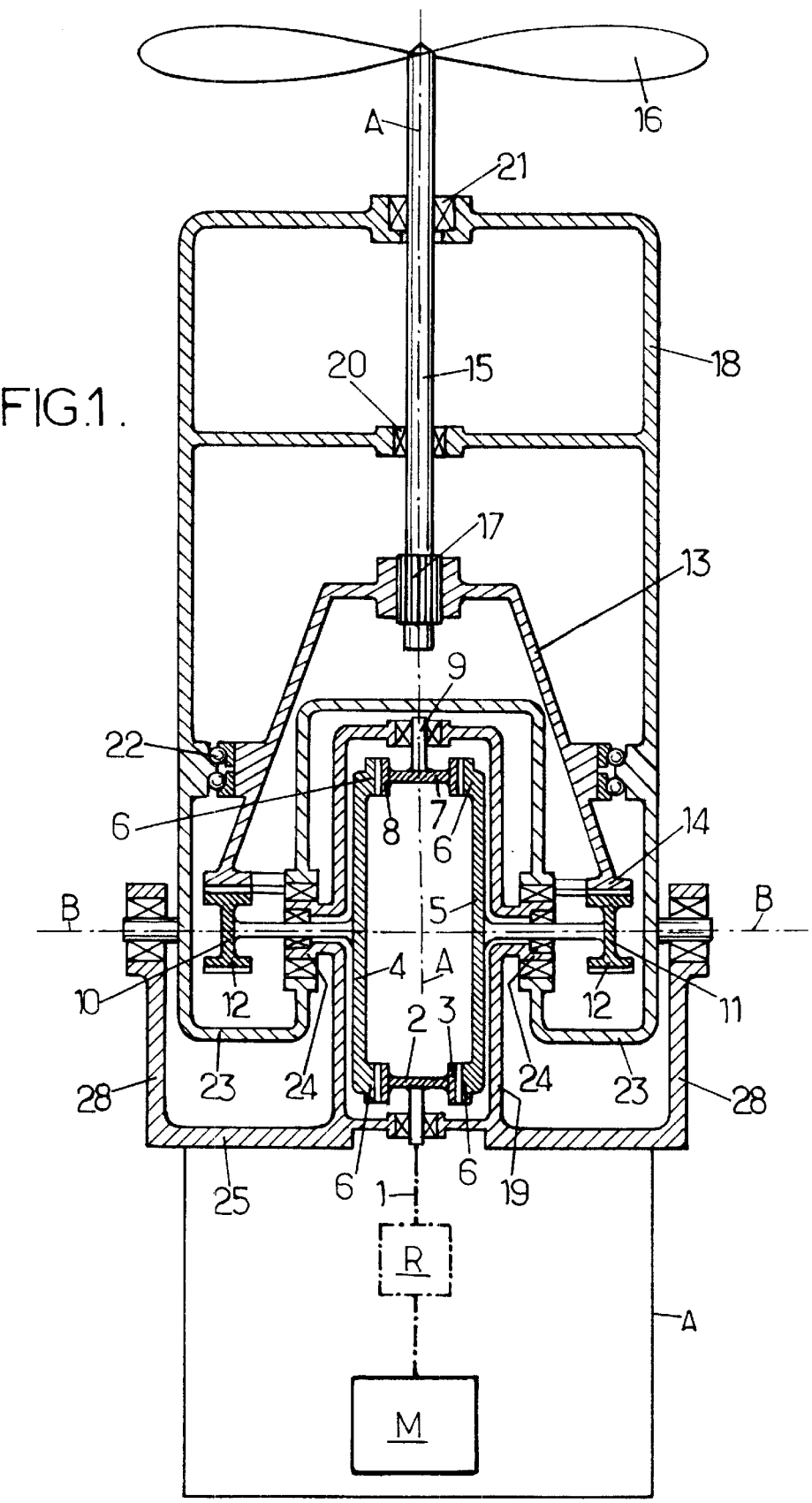
FIG. 1 is a partial schematic view in axial section of a pivoting power transmission unit according to the invention.
Figure 2:
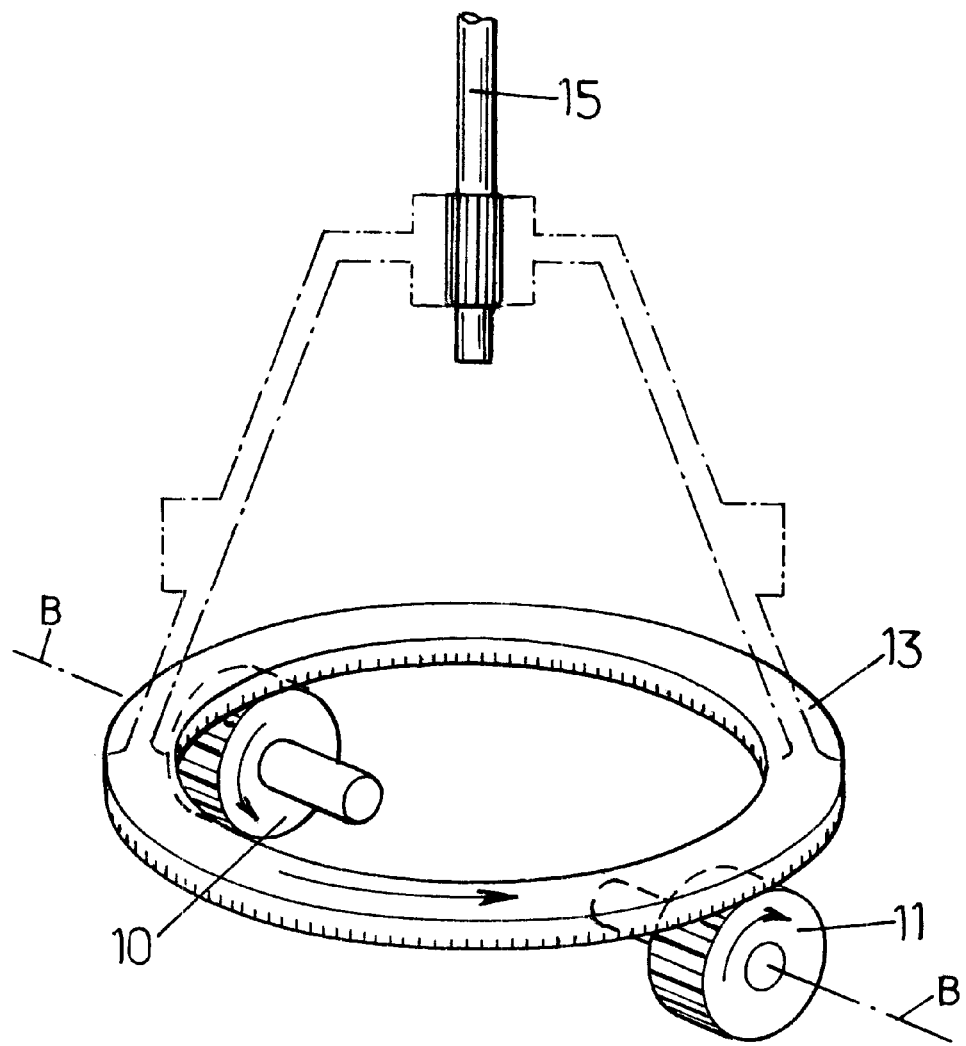
FIG. 2 is a schematic perspective view showing the cooperation of the elements constituting the second reduction gear stage of the power transmission unit in FIG. 1, and FIGS. 3 and 4 show schematically, partly in section and partly in side elevation, the pivoting power transmission unit in FIGS. 1 and 2 with its pivoting and non-pivoting casings, in the two extreme swivelling positions of the pivoting casing corresponding respectively to the aeroplane mode and to the helicopter mode.

The pivoting power transmission unit in FIGS. 1 to 4 comprises an input shaft 1 connected, in a manner shown schematically, to the output shaft of an engine M, such as a turboshaft power unit of a convertible-type aircraft A (shown schematically), possibly via a reduction gear unit R with at least one interposed reduction gear, shown schematically, so that the input shaft 1 is driven in rotation about its longitudinal axis at a relatively high speed, but nevertheless very much lower, for example by a ratio of 2 or 3, than the speed of rotation of the turboshaft power unit output shaft. At its end at the opposite end to its connection to this turboshaft power unit M, the input shaft 1 is joined in coaxial rotation about its axis with an input pinion 2, which is a cylindrical pinion, with straight or helical teeth 3.

The input pinion 2 is engaged between the peripheral portions of two gearwheels 4 and 5 with peripheral face teeth 6 of the face gear type, these two gearwheels 4 and 5 being mounted in rotation facing each other and coaxially about a pivot axis B—B. The input pinion 2 is thus mounted between the peripheries of the two gearwheels 4 and 5 with peripheral face teeth 6 with the teeth 3 of the pinion 2 meshing with their teeth 6 so that the two gearwheels 4 and 5 are contrarotating about the pivot axis B—B which is substantially perpendicular to the axis of pinion 2 and of the input shaft 1.

In order to balance the loads introduced by the cooperation of the teeth 3 and 6 of the input pinion 2 and the contrarotating gearwheels 4 and 5, the first reduction gear stage embodied by the pinion 2 and the two gearwheels 4 and 5 is supplemented by a balance pinion 7, similar to the input pinion 2, i.e. embodied in the form of a cylindrical pinion, with straight or helical teeth 8, which is engaged between the peripheries of the two coaxial and contrarotating gearwheels 4 and 5, in a position diametrically opposite the input pinion 2 relative to the pivot axis B—B, which is the axis of the gearwheels 4 and 5, and this balance pinion 7, the teeth 8 of which engage with the teeth 6 of the wheels 4 and 5, is mounted as an idler rotating about an axis 9 kept substantially in the prolongation of the axis of the input pinion 2 and the input shaft 1.

As a variant, provision may be made for several balance pinions such as 7, regularly distributed in a circumferential direction about the pivot axis B-B, the teeth 8 of each being engaged with the teeth 6 of the coaxial contrarotating wheels 4 and 5, each of the balance pinions such as 7 being mounted as idlers rotating about an axis such as 9 which is then kept coplanar with the axis of the input shaft 1 and the input pinion 2.

The pivoting transmission unit also comprises a second reduction stage which comprises two identical intermediate pinions 10 and 11, which are cylindrical pinions with straight or helical teeth 12, each of which is joined in rotation, about the pivot axis B—B, with one respectively of the two gearwheels 4 and 5, with which the corresponding intermediate pinion 10 or 11 is coaxial about this pivot axis B—B.

The second reduction gear stage also comprises a third gearwheel 13 with peripheral face teeth 14 of the face gear type, which meshes simultaneously with the teeth 12 of the two intermediate pinions 10 and 11, and which is therefore driven in rotation about its axis, substantially coplanar with the axis of the input pinion 2 and the input shaft 1, so that the third gearwheel 13 can drive in coaxial rotation an output shaft 15, which constitutes the rotor shaft or mast 16, the axis A—A of which is the axis of rotation which can swivel with the third gearwheel 13 about the pivot axis B—B, by reason of the rotation about this axis B—B of each of the two intermediate pinions 10 and 11 on which the third input gear 13 runs while being supported in some way.

In such a transmission unit, it will be understood that the torque applied to the input pinion 2 by the input shaft 1 is then divided over the two coaxial and contrarotating gearwheels 4 and 5, this division giving a reduction in the stresses introduced into these gears 4 and 5, and therefore optimising the dimensioning, and therefore the weight of each of them, thus saving weight. Fifty per cent of the torque is thus transmitted to each of the two intermediate pinions 10 and 11, respectively joined in rotation with the gearwheels 4 and 5, and revolving in a contrarotating manner, like the gears 4 and 5, enabling the third gearwheel 13, to which all of the torque is applied, to be driven in rotation, as shown schematically in FIG. 2. This torque recovered from the third gearwheel 13 is thus transmitted to the shaft or mast 15 of the rotor 16.

The use of the three gearwheels 4, 5 and 13 with peripheral face teeth 6 or 14 of the face gear type allows high reduction ratios (from 6 to 10 per stage) to be obtained with a minimum number of pairs of teeth engaged with each other, and for each of which one of the sets of teeth is that of a cylindrical pinion and the other that of a gearwheel of the face gear type.

As shown in FIG. 1, the intermediate pinions 10 and 11 have a diameter, and therefore a number of teeth, smaller than the diameter and the number of teeth of the gearwheels 4 and 5, so that the third gearwheel 13 is given a substantially truncated-cone shape and a hollow structure which allows this third gearwheel to house all of the balance pinion 7 and nearly half of the gearwheels 4 and 5, at the opposite end to the input pinion 2. This special shape of the third gearwheel 13 also helps to give the transmission unit excellent overall compactness.

To provide the drive in rotation of the output shaft or rotor mast 15, the third gearwheel 13 has a central coaxial bore with axial splines 17, projecting radially towards the inside of this bore, and engaging with complementary axial splines projecting radially outwards on the base of the output shaft 15.

Figure 3:
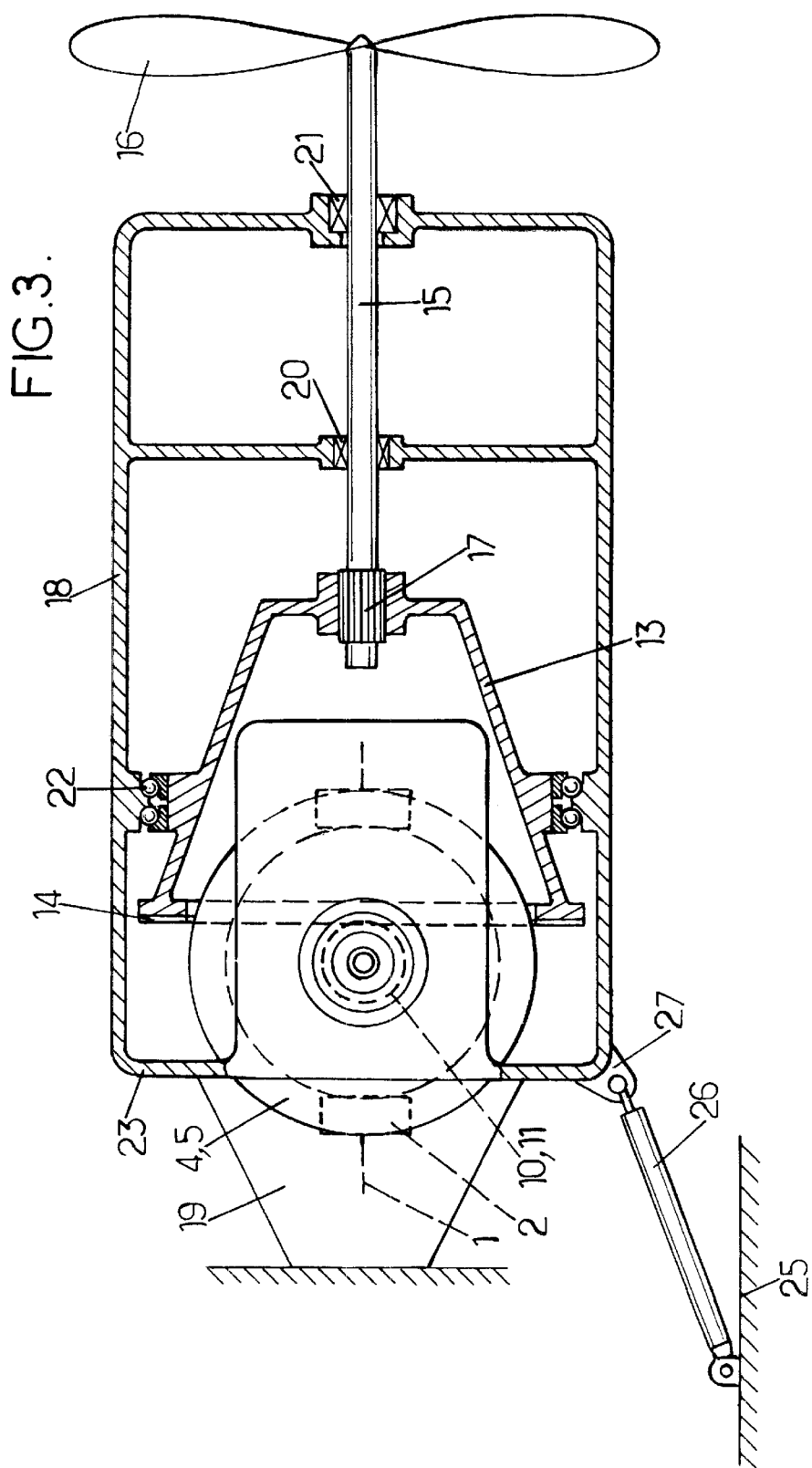
Figure 4:
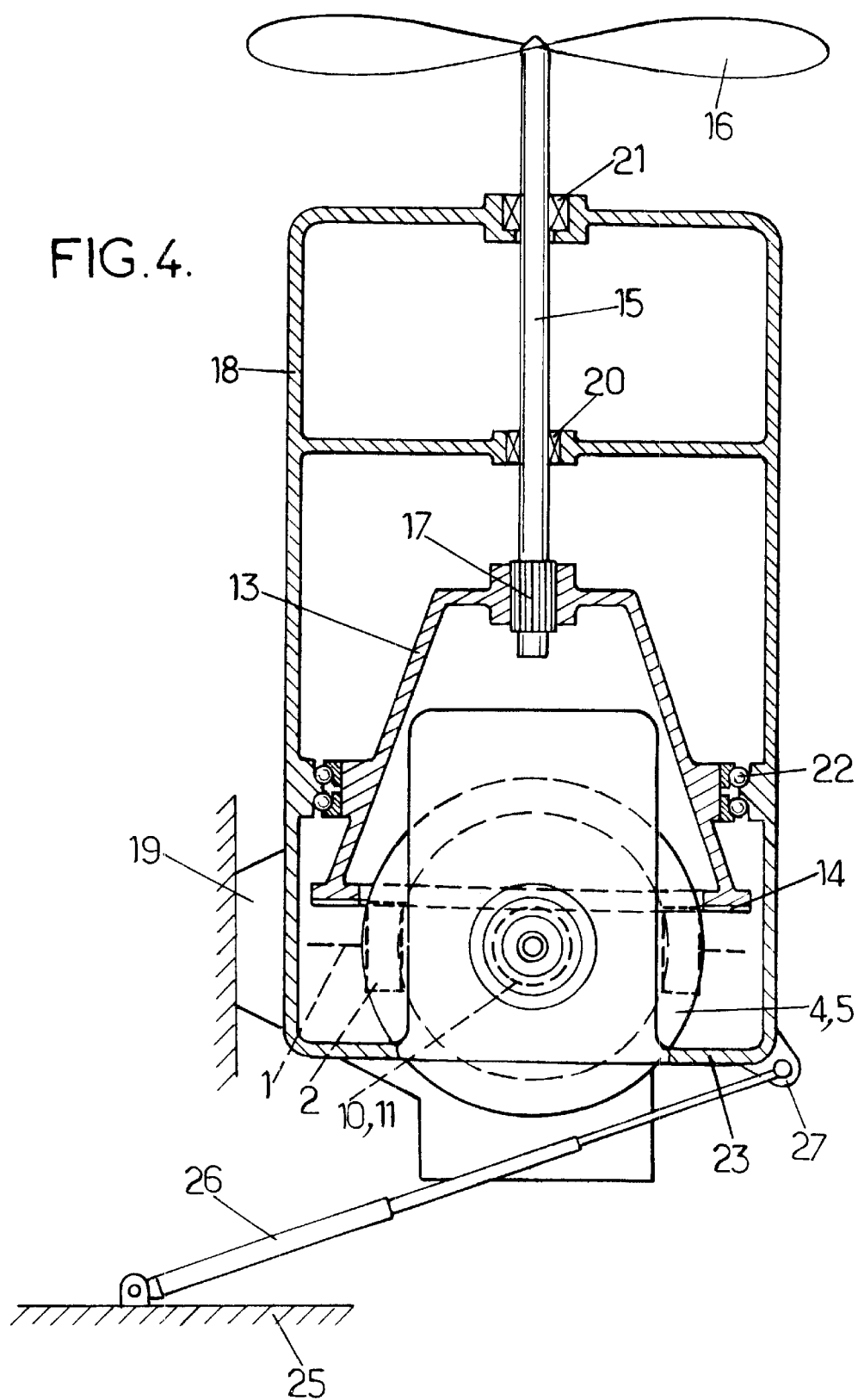

As shown in FIGS. 3 and 4, the second reduction gear stage, comprising the intermediate pinions 10 and 11 and the third gearwheel 13, has its different components mounted and guided in rotation in a casing 18 mounted so as to pivot about the pivot axis B—B relative to a stationary casing 19, not pivoting about the pivot axis B—B and rigidly linked to a carrier structure which, in the example of embodiment considered, is the structure of the stationary rear part of the corresponding drive pod, this stationary casing 19 housing the first reduction gear stage, of which the input pinion 2 and input shaft 1, the two coaxial and contrarotating gearwheels 4 and 5 and the balance pinion 9 are mounted and guided in rotation in this stationary casing 19.

The output shaft 15 is extended outside the pivoting casing 18 since at the same time and directly it constitutes the mast of the rotor 16. This output shaft 15, driven in rotation about itself by axial splines on its base, engaging with the axial splines 17 of the third gearwheel 13, is guided in rotation by two bearings 20 and 21 spaced axially apart from each other along the shaft 15, between the splines on its base and the portion of shaft 15 outside the pivoting casing 18. The third gearwheel 13 is guided in rotation in this pivoting casing 18 by a bearing 22 which is, for example, a double-row skew-contact ball bearing, in order to absorb any axial load which may be applied to this gearwheel 13, due to the fact that it is meshed with the two intermediate pinions 10 and 11. The end portion of the pivoting casing 18 which is situated at the end opposite the rotor 16 has a rounded shape concave towards the intermediate pinions 10 and 11 to house these completely, and this end portion is divided, as shown schematically in FIG. 1 into two side chambers 23, spaced axially apart from each other along the pivot axis B—B so that the pivoting casing 18 straddles the stationary casing 19, on which the pivoting casing 18 can be mounted so as to swivel about the pivot axis B—B on the two side chambers 23. These chambers 23 may each be mounted so as to swivel about one respectively of two pivots 24 projecting towards the outside of the stationary casing 19 and coaxial about the pivot axis B—B.

To provide proper guidance of the pivoting casing 18 in its swivelling movements about the pivot axis B—B, it is also possible and even preferable to mount the swivelling casing 18 so as to swivel about the axis B—B on lateral elements 28 of the stationary structure 25 or of the stationary casing 19 which are facing the outer walls of the side chambers 23 of the pivoting casing 18.

Also as a variant, the pivoting chamber 18 is mounted so as to swivel only on these lateral elements 28 of a carrier structure or of the stationary casing 19, without swivelling on the central part of the stationary casing 19.

This embodiment variant is preferred since the loads coming from the rotor mast 15 are thus transmitted directly to the carrier structure, so that these loads no longer pass through the transmission unit. This considerably reduces the deformation which may be introduced by these loads in the pinions and gearwheels of the two reduction gear stages, making it easier to optimise the bearing surfaces of the teeth of these pinions and gearwheels.

The pivoting movements of the pivoting casing 18 about the axis B—B are controlled by at least one actuator, which is supported on a stationary point on the carrier structure, shown schematically as 25 in FIGS. 3 and 4, rather than on the stationary casing 19, for the same reasons as set out above, in order to introduce as little load as possible into the gearing of the two reduction gear stages. This actuator may be a rotary actuator but, preferably, a linear actuator is used as shown schematically as 26 in FIGS. 3 and 4, and which may be a hydraulic jack or a mechanical jack, for example a ball screw jack, or again an electro-mechanical jack with a rack meshing with a gear wheel driven in rotation by an electric motor, this linear actuator 26 being articulated at one end to an arm 27 projecting from the outside of the pivoting casing 18, and at the other end to the stationary point on the carrier structure 25. To balance the loads, two actuators such as 26 may be used, each connecting one of two stationary points of the structure 25 to one respectively of two arms 27 on the pivoting casing 18, each projecting from one respectively of the side chambers 23 of this pivoting casing 18.

In addition to the advantages resulting directly from the use of gearwheels of the face gear type 4, 5 and 13 cooperating with cylindrical pinions 2, 9, 10 and 11, the teeth of which may be straight or helical, and which are in particular the great compactness of the transmission unit, its simplified maintenance and the saving in weight due to the small number of teeth engaged, and to the division of the torque over the two coaxial and contrarotating gearwheels 4 and 5, the pivoting transmission unit of the invention secures another advantage, which is that the embodiment of an interposed reduction gear unit R, placed between the input shaft 1 and the engine M, can be simplified since the reduction gear stage or stages of the reduction gear unit R may each be a reduction gear stage with cylindrical pinions having straight or helical teeth.

The embodiment of the rear stationary reduction gear unit of the transmission can therefore be simplified as a consequence of the embodiment of the pivoting transmission unit of the invention with gearwheels of the face gear type.

The invention has now been described in detail for purposes of clarity and understanding. However, it will be appreciated that certain changes and modifications may be practised within the scope of the appended claims.

I claims:

1. A pivoting power transmission unit for transmitting rotational drive from at least one source of power to at least one driven component configured to revolve about an axis of rotation and configured to be swivelled about a pivot axis substantially perpendicular to said axis of rotation, the pivoting power transmission unit comprising:

a cylindrical input pinion, configured to be driven in rotation by said at least one source of power about an axis which is substantially perpendicular to said pivot axis;

first and second gear wheels with peripheral face teeth of the face gear type which are facing each other, the first and second gear wheels being coaxial with said pivot axis and in meshing engagement with said input pinion so as to contra-rotate about said pivot axis when rotated by the input pinion;

two cylindrical intermediate pinions, each of which is joined to rotate co-axially about said pivot axis with one respectively of the first and second gear wheels; and a third gear wheel with peripheral face teeth of the face gear type which is in meshing engagement with each of said two intermediate pinions, the third gear wheel being configured to drive in rotation an output shaft coupled to said at least one driven component.

2. A pivoting power transmission unit according to claim 1, further comprising at least one cylindrical balance pinion, mounted as an idler rotating about an axis substantially co-planar with the axis of the cylindrical input pinion, the at least one cylindrical balance pinion being in meshing engagement with said contra-rotating first and second gearwheels.

3. A pivoting power transmission unit according to claim 2, comprising a single balance pinion, the axis of rotation of which is substantially co-axial with the axis of the cylindrical input pinion.

4. A pivoting power transmission unit according to claim 2, wherein the at least one cylindrical balance pinion has one of the following: (a) straight teeth, and (b) helical teeth.

5. A pivoting power transmission unit according to claim 1, wherein said third gearwheel has a hollow, substantially truncated-cone shape, and houses parts of the first and second gearwheels, at an opposite end to said cylindrical input pinion.

6. A pivoting power transmission unit according to claim 5, wherein the third gearwheel further houses a cylindrical balance pinion, mounted as an idler in meshing engagement with said first and second gearwheels.

7. A pivoting power transmission unit according to claim 1, wherein the third gearwheel has a central axial bore with splines for engaging with axial splines on the output shaft to drive said output shaft in rotation.

8. A pivoting power transmission unit according to claim 1, further comprising: a first reduction gear stage comprising said input pinion, and said first and second gearwheels; and a second reduction gear stage comprising the two cylindrical intermediate pinions, said third gearwheel, and the output shaft, with said second reduction gear stage being mounted and guided in rotation in a casing mounted so as to pivot relative to the first reduction gear stage about said pivot axis, and with pivotal movement of said second reduction gear stage being controlled by at least one actuator.

9. A pivoting power transmission unit according to claim 8, wherein the first reduction gear stage further comprises a cylindrical balance pinion, mounted as an idler in meshing engagement with said first and second gearwheels.

10. A pivoting power transmission unit according to claim 8, wherein said first reduction gear stage is mounted and guided in rotation in a stationary casing, not pivoting about said pivot axis, and on which the pivoting casing is mounted so as to swivel about said pivot axis, and is configured to be swivelled by at least one actuator supported on a stationary member.

11. A pivoting power transmission unit according to claim 9, wherein the member is one of the following: (a) a carrier structure, and (b) said stationary casing.

12. A pivoting power transmission unit according to claim 10, wherein the at least one actuator is linear and linked at one end to an arm projecting from the pivoting casing and at its other end to said stationary point on the member.

13. A pivoting power transmission unit according to claim 12, in which the linear actuator is selected from a hydraulic jack-type and an electro-mechanical jack type with a ball screw or rack.

14. A pivoting power transmission unit according to claim 8, wherein said third gearwheel is guided in rotation in said pivoting casing by at least one double-row skew-contact ballbearing, and the output shaft is guided in rotation in the pivoting casing by at least two bearings spaced apart axially.

15. A pivoting power transmission unit according to claim 1, wherein the cylindrical input pinion has one of the following: (a) straight teeth; (b) helical teeth.

16. A pivoting power transmission unit according to claim 1, wherein the two cylindrical intermediate pinions have one of the following: (a) straight teeth; (b) helical teeth.

17. An aircraft having an aeroplane mode of operation and a helicopter mode of operation, comprising at least one pivoting power transmission unit for transmitting rotational drive from at least one source of power to at least one rotor configured to revolve about an axis of rotation and configured to be swivelled about a pivot axis substantially perpendicular to said axis of rotation when switching modes of operation, the pivoting power transmission unit comprising:

a cylindrical input pinion, configured to be driven in rotation by said at least one source of power about an axis which is substantially perpendicular to said pivot axis;

first and second gear wheels with peripheral face teeth of the face gear type which are facing each other, the first and second gear wheels being coaxial with said pivot axis and in meshing engagement with said input pinion so as to contra-rotate about said pivot axis when rotated by the input pinion;

two cylindrical intermediate pinions, each of which is joined to rotate co-axially about said pivot axis with one respectively of the first and second gear wheels; and a third gear wheel with peripheral face teeth of the face gear type which is in meshing engagement with each of said two intermediate pinions, the third gear wheel being configured to drive in rotation an output shaft coupled to said at least rotor.

* * * * *